Nov. 12, 1963     J. E. FREDERICK     3,110,817
ELECTRIC SPEED GOVERNOR FOR PRIME MOVERS
Filed Sept. 11, 1961     6 Sheets-Sheet 1

INVENTOR
James E. Frederick

Nov. 12, 1963     J. E. FREDERICK     3,110,817
ELECTRIC SPEED GOVERNOR FOR PRIME MOVERS
Filed Sept. 11, 1961     6 Sheets-Sheet 4

3,110,817
Patented Nov. 12, 1963

3,110,817
ELECTRIC SPEED GOVERNOR FOR
PRIME MOVERS
James E. Frederick, Clarence, N.Y., assignor to Westinghouse Electric Corporation, East Pittsburgh, Pa., a corporation of Pennsylvania
Filed Sept. 11, 1961, Ser. No. 137,296
8 Claims. (Cl. 290—40)

This invention relates to electric systems of control including magnetic amplifiers and more particularly to systems of control for governing the operation of any mechanical or electrical load but, as herein disclosed, for governing the operation of a prime mover, or prime movers, coupled to drive electric generators, as for example alternators.

One broad object of this invention is the provision of accurate and reliable electric governing control means for the prime mover driving electric generating means.

Another broad object of this invention is the provision of means to hold a very close steady-state control of the frequency of an alternator, regardless of alternator load changes, coupled to a prime mover.

It is also an object of this invention to use smaller and less expensive components and simpler circuitry than used heretofore and yet to obtain an overall equally high standard of performance than was possible to obtain heretofore.

It is also an object of this invention to accomplish the desired functions without the use of tubes or other fragile components having a rather limited useful life but with the use of components which have a long useful life and which will withstand shock and vibration with no damage to its components.

It is also an object of this invention to provide a control signal for stabilizing the actuation of the throttle of a prime mover in accordance with the rate of change of throttle position from a selected position, and in accordance with the rate of change of load.

The objects recited are merely illustrative. Other objects and advantages will become more apparent from a study of the following specification and the accompanying drawings, in which:

FIGURE 1 is a schematic showing, in block form, of the electrical and hydraulic elements of this invention, as used with an engine and the generator coupled to it;

FIGS. 2A and 2B together are a diagrammatic showing of the electrical apparatus and mechanical apparatus and the engine to be controlled;

Figure 1:
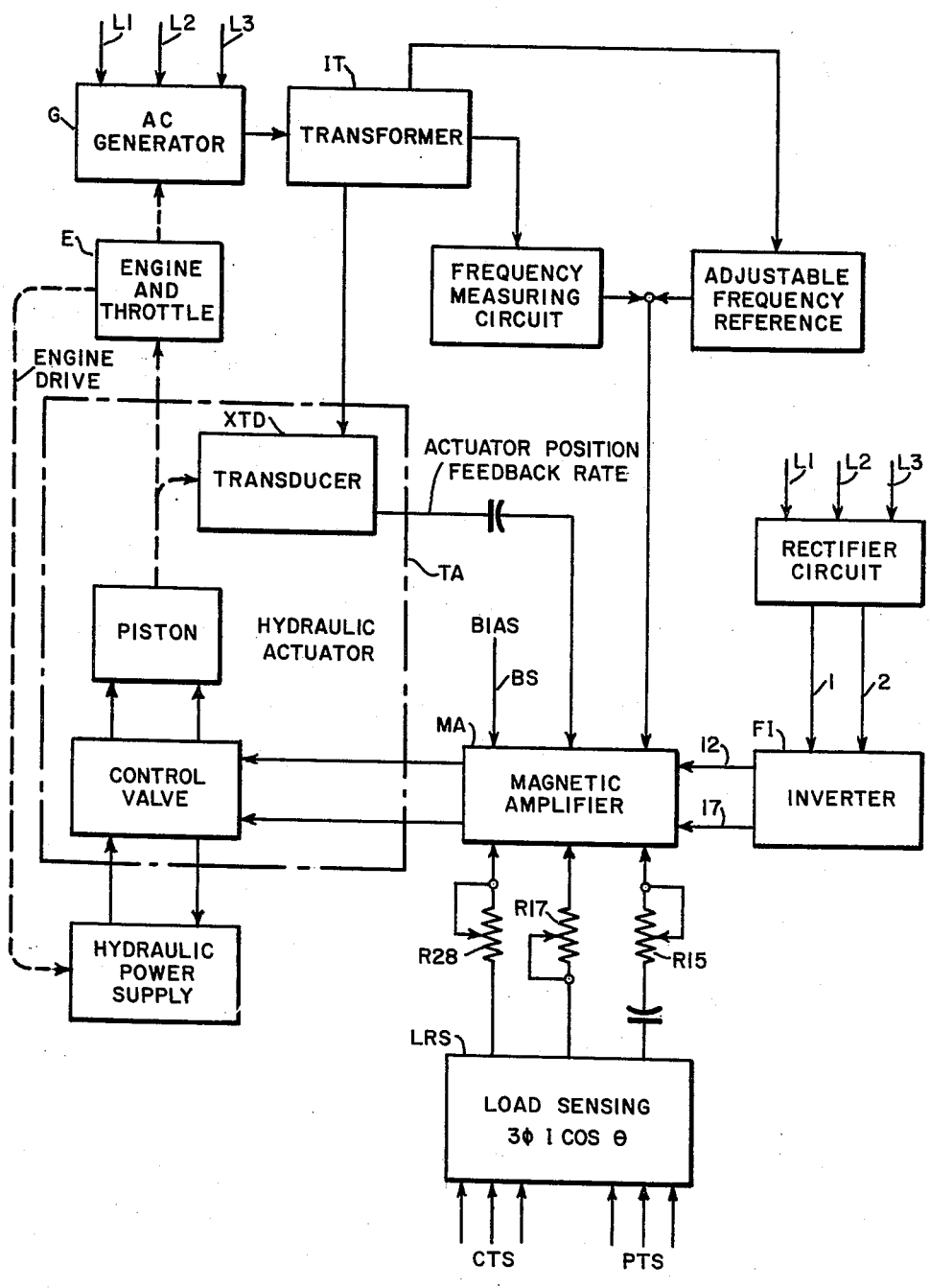

To gain a broad understanding of this invention, a brief description of the showing in FIG. 1 may be helpful.

The block designated A.C. Gen. represents the alternator coupled to the engine E. The block showing the engine includes the throttle. The generator supplies the load not shown connected to the leads L1, L2 and L3. These leads also supply the control circuitry connected to the leads CTS and PTS. Through leads CTS a current signal and leads PTS a potential signal, are supplied to the circuitry having an output proportional to $3\phi I \cos \theta$, where I represents the load current of the generator and $\cos \theta$ is an indication of the power factor.

The engine, through a suitable engine drive operating a pump receiving a liquid supply, operates the hydraulic power supply for supplying liquid to the hydraulic actuator TA. This hydraulic actuator includes control valve means for actuating a piston which in turn actuates the throttle T. The piston is also coupled to an electromagnetic transducer XTD for producing an electrical output that is a function of rate of piston movement and in consequence rate of throttle movement.

The control valve means is actuated by a pair of push-pull electromagnets, energized from the main circuits of the magnetic amplifier means MA, acting, through suitable magnetically actuated cores, controlling valve means for controlling the hydraulic actuator TA. This magnetic amplifier means actually consists of two units MA1 and MA2, as shown in FIG. 2B. To provide small highly efficient and reliable amplifier means a frequency inverter FI through leads 12 and 17, supplies alternating current at 1000 to 1200 c.p.s. to the amplifier means. The inverter is supplied through leads 1 and 2 with direct current, at a low voltage, say twelve volts, from any suitable source but as shown from the rectifier circuit connected to the leads L1, L2 and L3.

The key to the engine control is thus the difference of the outputs of the magnetic amplifiers MA1 and MA2 that is, the operation of the control actuator of the amplifying means. This difference in output in turn depends on the control signals supplied to the magnetic amplifiers.

The generator G also supplies an isolation transformer IT. This isolation transformer supplies energy to a frequency measuring circuit and an adjustable frequency reference circuit. The difference in the signals of these two frequency responsive circuits is supplied to one set of control winding of the magnetic amplifier means.

The magnetic amplifier also receives a bias signal, an actuator feed-back rate signal, a load rate signal, an adjustable droop signal, and a signal for effecting proper parallel operation of two or more generators when such operation is involved.

Figure 2A:
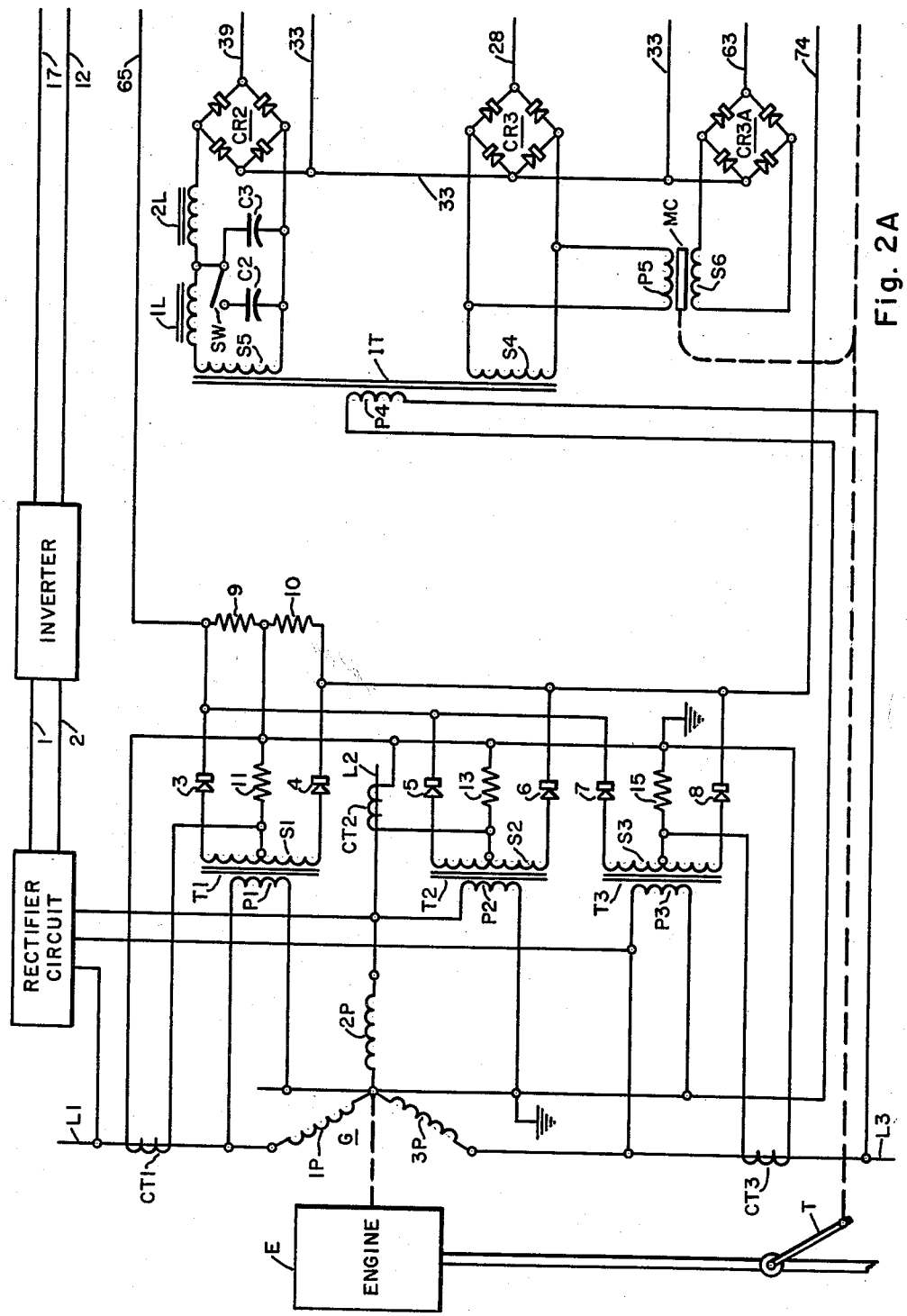
Figure 2B:
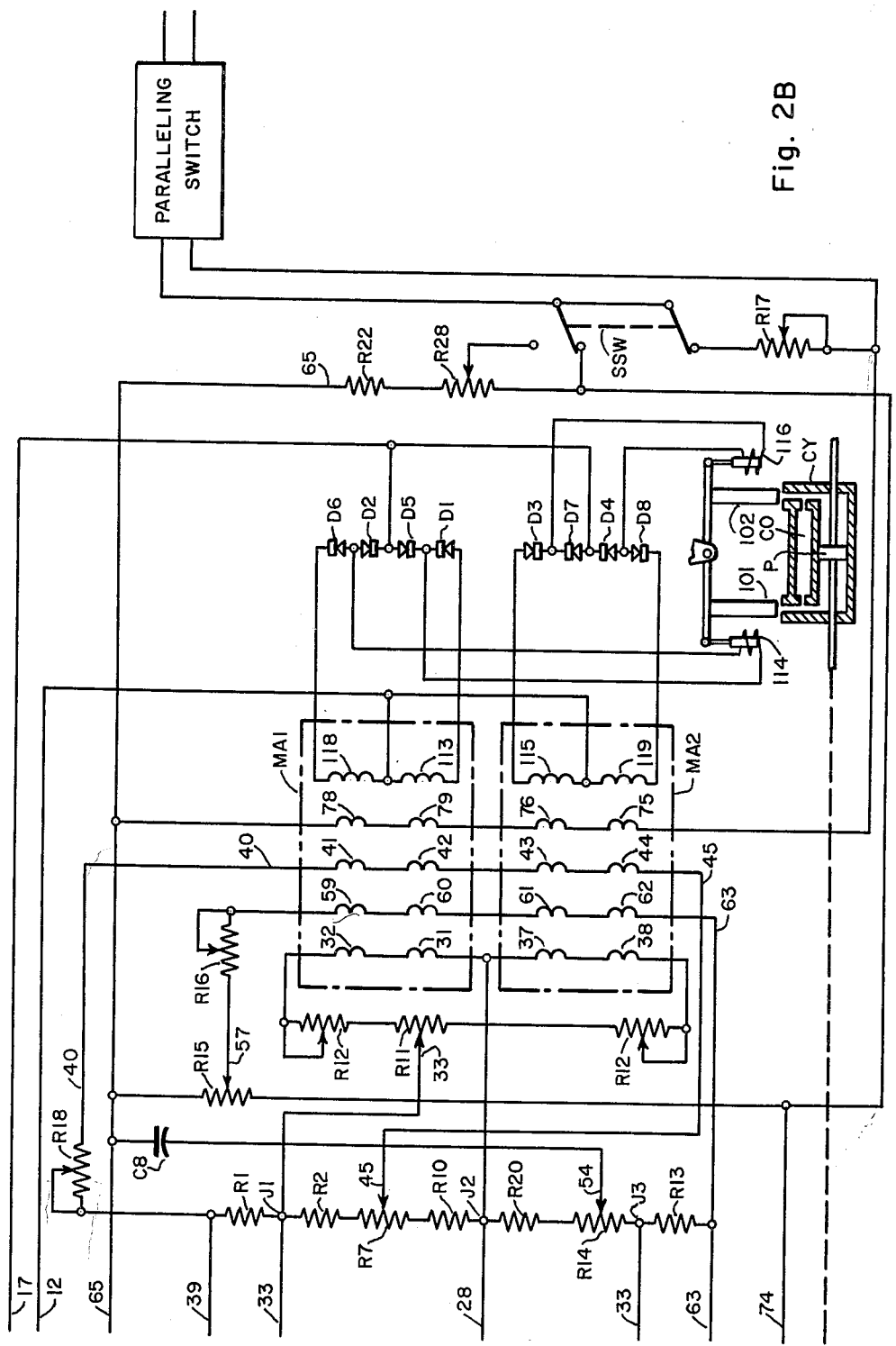

To better understand this invention reference may be had to FIGS. 2A and 2B.

The engine E is shown coupled to drive the alternator, or generator, G, which generator in use is connected to supply alternating current energy to the main leads L1, L2 and L3 and these leads are also connected to supply electric energy to the control circuitry.

Suitable transformers and rectifiers, as shown in more detail in the J. T. Liebel Patent No. 2,913,588, but herein shown in block form and designated rectifier circuit, are connected to the leads L1, L2 and L3 as shown. This rectifier circuit supplies a direct current to leads 1 and 2. Leads 1 and 2, which may, of course, be supplied from a 12 volt battery, are connected to the frequency inverter shown in block form. This inverter is also shown in more detail in the above-mentioned J. T. Liebel patent and in the Richard L. Bright et al. Patent No. 2,783,384. The output of the inverter is supplied to leads 12 and 17. The output of these leads is at about 8 volts and at a frequency of from 1000 to 1200 cycles per second. This alternating current is of proper voltage and frequency to supply the main windings of the magnetic amplifiers hereinafter discussed in more detail.

A transformer primary winding P1 of transformer T1 is shown connected across winding 1P; a transformer primary winding P2 of transformer T2 is shown connected across winding 2P; and a transformer primary winding P3 of transformer T3 is shown connected across winding 3P.

Figure 6:
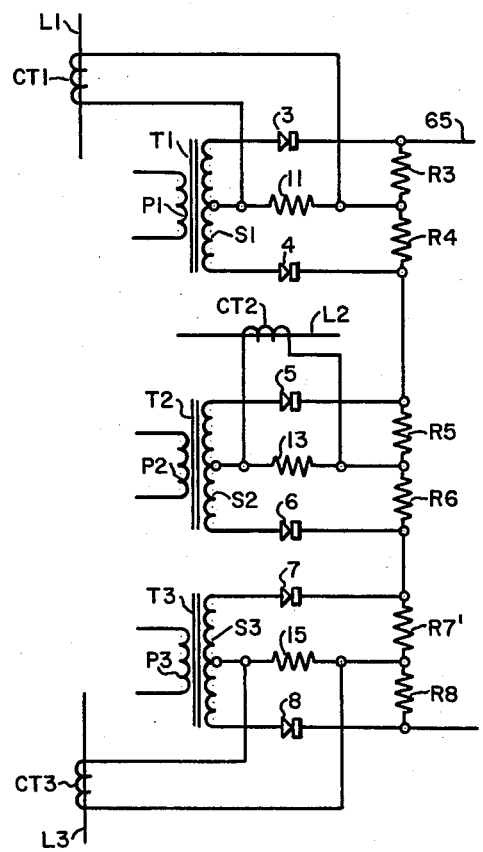
FIG. 6 is a showing of load sensing circuitry that may be used in the showing of FIGS. 2A and 2B.

Referring first to FIG. 6, these transformers T1, T2 and T3 have center-tapped secondary windings S1, S2 and S3 all connected through their respective diodes 3 and 4, 5 and 6, and 7 and 8 across their respective resistors R3 and R4, R5 and R6, and R7 and R8.

The center-tap of secondary winding S1 is, through resistor 11, connected to the junction between resistors R3 and R4. The center-tap of secondary winding S2 is, through resistor 13, connected to the junction between resistors R5 and R6. The center-tap of secondary winding S3 is, through resistor 15, connected to the junction between the resistors R7 and R8.

The outputs of the current transformers CT1, CT2 and CT3 are connected, respectively, across the resistors 11, 13 and 15.

Looking at the circuitry involving transformer T1 only, it can be seen that due to the action of the diodes 3 and 4 alternate half wave currents will flow in resistors R3 and R4 while a full wave voltage will flow, or appear, across resistor 11. If another voltage is applied across resistor 11, that is, the output of CT1 is, as shown, supplied across resistor 11, it is apparent that during the in phase half cycle, remembering that the current flow through 11 is full-wave rectified and therefore of constant polarity, the voltage across resistor 11 will add during the in phase half cycle and during the out of phase half cycle it will subtract.

Therefore, since the voltage appearing across resistors R3 and R4 is a result of alternate half cycles, the drop across resistor 11 from the output of CT1 will add to one and subtract from the other. The actual output then is a result of the difference between the voltages across R3 and R4 and for the in phase case condition will be proportional to the drop across resistor 11. For the case of 180 degrees out of phase relationship the output will also be proportional to the voltage across resistor 11, however, of opposite polarity. At 90° phase angle, the drop across resistor 11 will have equal effect on the drop across resistors R3 and R4 and the net difference will equal to zero.

In considering only T1, the single phase circuit, an alternating current voltage appears in the output, however, when the circuit is used in a three phase arrangement, as shown in FIG. 6 the alternating current voltages add to zero and the output across leads 65 and 74 is a direct current voltage signal proportional to $3\phi I \cos \theta$. The conductor 65 is positive and conductor 74 negative. It is this load signal that is supplied to the magnetic amplifier. Actually a load rate signal is used. This will become more apparent hereinafter.

The $3\phi I \cos \theta$ signal may also be obtained by a simpler and somewhat less expensive circuit. This simpler circuit is actually shown in FIG. 2A.

These transformers T1, T2 and T3 having the center-tapped secondary windings S1, S2 and S3 are all connected in parallel, through their respective diodes 3 and 4, 5 and 6, and 7 and 8, across the resistors 9 and 10. The center taps of each secondary are, through their respective resistors 11, 13 and 15, connected to the junction between the resistors 9 and 10. The junction between resistors is suitably grounded, which means the right-hand terminals of the resistors 11, 13 and 15 and any circuit connected to these terminals are grounded.

The output of current transformer CT1 is connected across resistor 11; the output of current transformer CT2 is connected across resistor 13; and the output of current transformer CT3 is connected across resistor 15. By thus mixing the generator voltage output and the current output, a voltage appears across leads 65 and 74 that is a function of $3\phi I \cos \theta$.

The circuitry hereinbefore disclosed, to obtain an electrical signal that is a function of $3\phi I \cos \theta$, is a simplified and improved and thus more economical circuitry, over the circuitry shown and described in the F. P. Emery Patent No. 2,909,672 for obtaining an electric signal that is a function of $3\phi I \cos \theta$.

The engine is controlled by the throttle T, which is actuated by a suitable link or throttle gear LK from the throttle actuator TA. The throttle actuator includes a piston P in the cylinder Cy. Liquid under a suitable constant pressure enters conduit CO and thus provides a liquid pressure at both sides of the piston P through the system of conduits shown.

Whether or not the pressure is the same on both sides of the piston P depends on the positions of the valves 101 and 102 with respect to the discharge openings adjacent the bottom ends of the valves. The valves are actuated by push-pull electromagnets having the actuating coils 114 and 116 for moving their magnetic actuators. These coils are in the output circuits of the magnetic amplifiers MA1 and MA2, respectively. The input to the main windings of the magnetic amplifiers is, as shown, provided from the alternator G, through the frequency inverter FI above discussed.

The energizing circuits for the main windings may be traced from lead 12, when lead 12 is positive through the main winding 113 of magnetic amplifier MA1, rectifier D1 actuating coil 114, and rectifier D2, to the conductor 17. When lead 12 is positive, a circuit is also established through the main winding 115 of magnetic amplifier MA2, the rectifier D3, actuating coil 116, and rectifier D4 to the lead 17.

When lead 17 is positive, a circuit is established through rectifier D5, coil 114, rectifier D6, and the main winding 118 of magnetic amplifier MA1 to conductor 12, at the same time a circuit is also established from conductor 17, through rectifier D7, coil 116, rectifier D8 and the main winding 119 of magnetic amplifier MA2 to the conductor 12.

From the foregoing, it is apparent that the outputs of the magnetic amplifiers MA1 and MA2 are applied to the actuating coils 114 and 116 in a push-pull manner and thus to the magnetic cores of AM1 and AM2, thus providing a very effective and sensitive throttle actuator.

Since the magnetic amplifiers here used are of the self-saturating type, the true effective function of coils 114 and 116 is thus determined by the total effect of all the control windings on the magnetic amplifiers. The preferred point of operation of each magnetic amplifier used in this control is preferably at, or near, the midpoint of the straight portion of the operating characteristic, as at point "a" of the operating characteristics shown in FIG. 3. The design and selection of the amplifiers is such that their operating characteristics are as near the same as possible. Further, the straight portion of the characteristic is preferably quite steep but not actually vertical.

To cause each magnetic amplifier to operate at or near the midpoint, as point "a" of its characteristic, the magnetic amplifiers are provided with bias windings. The bias windings are energized from the rectifier CR3. The alternating current terminals of rectifier CR3 are connected directly to the secondary winding S4 of the isolation transformer IT whose primary winding P4 is connected directly across phase 3P, but may be connected to any source of alternating current energy of suitable voltage. The important feature is that a source of constant direct current voltage is available on leads 28 and 33.

To energize the bias windings a circuit is established from the positive conductor 28, through bias windings 31 and 32 of magnetic amplifier MA1, through adjustable resistor R12, bias balance adjustable resistor R11, to the negative conductor 33. Another energizing circuit is also established from the positive conductor 28 through the bias windings 37 and 38 of the magnetic amplifier MA2, the second adjustable resistor R12, the bias balance adjustable resistor R11, to negative conductor 33.

Figure 3:
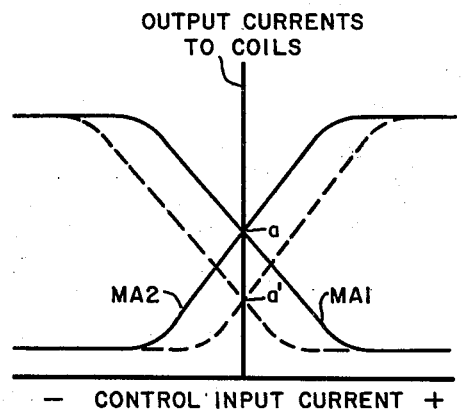
FIG. 3 shows representative operating characteristics of the magnetic amplifiers used.

Since the adjustable resistors R12 and R12 and R11 are in the circuits of the biasing windings, these resistors can be used to adjust the bias level, i.e., the "up-and-down" position on the magnetic characteristic of both magnetic amplifiers may be adjusted, as for example to the dotted lines appearing in FIG. 3. Since the relative magnitudes of the resistances of the resistors R12 and R11 in the respective circuits of bias windings 31 and 32 and 37 and 38 are adjustable, it is apparent that a decrease of resistance in the circuit of the bias windings 31 and 32 will effect an increase in resistance in the circuit of the bias windings 37 and 38. Of course, the reverse effect is caused by a reverse operation of the adjustable resistor R11.

From the discussion of the circuitry and control of the bias windings it is apparent that the operations of the magnetic amplifiers may be adjusted to any level on the operating characteristic and that balanced operation may be obtained at the levels selected.

The output terminals of rectifier CR3 are also connected to energize several potentiometer circuits. The utility of the potentiometer circuits will become apparent as the description proceeds.

The transformer IT is provided with a primary winding P4 connected, as stated, directly across phase 3P and its secondary winding S5 is connected in a loop circuit with a first reactor 1L, having a selected reactance value, a second reactor 2L having a selected reactance value, and the alternating current terminals of rectifier CR2 as shown. A capacitor C3 of a selected capacitance value is connected in a loop circuit including the secondary S5 and reactor 1L. A second capacitor C4 having a selected capacitance value, may be, through switch SW, connected in parallel to the capacitor C3.

The direct current output terminals of the full-wave rectifier CR2 are connected across resistor R1. The connection is such that the negative terminal is connected to the negative conductor 33 and the positive terminal is connected to lead 39 to which the upper junction of the resistor R1 is also connected. The operating characteristics of the elements CR2, 1L, 2L, C3 and C4 and the windings of transformer T1 are so selected that the voltage impressed across leads 39 and 33 is rather accurately and sensitively substantially inversely proportional to frequency over a given range which includes the desired operating frequency of the alternator G. A rise of frequency from a selected value causes a decrease in voltage across leads 39 and 33 and a decrease in frequency from a selected value causes a rise in voltage across leads 39 and 33.

A full-wave rectifier CR3A is also connected across the secondary winding S4 but not directly. The alternating current terminals of the rectifier CR3A are supplied by the secondary windings S6 of the actuator position feedback transducer XTD. The primary winding P5 is connected directly to the output terminals of the secondary winding S4. The transducer has a movable magnetic core MC mechanically connected to the actuator. The magnetic coupling between primary P5 and secondary S6 is thus changed with the changes in actuator position. The alternating current output of secondary S6 is thus a function of throttle position or the equivalent, the position of the magnetic core MC. By proper selection of the elements the alternating current output of secondary S6 may be made directly proportional to throttle position.

The output of the secondary S6 is supplied to full-wave rectifier CR3A and the direct current voltage output of this rectifier connected directly across resistor R13, is directly proportional to throttle position. This circuitry, as described more in detail hereinafter, thus provides an output that may be used in the magnetic amplifiers as an actuator position feedback signal. The feedback is not used directly but is converted to a rate signal by the feedback capacitor C8 so that a feedback signal is present only at times of throttle movement.

Before a detailed discussion is made of the function of the magnetic amplifier control windings, it may be helpful to discuss the interconnection of the rectifiers CR2, CR3 and CR3A through the resistors R1, R2, R7, R10, R20, R14 and R13. With reference to leads 39 to 63, namely the positive terminals of rectifiers CR2 and CR3A, these resistors are all connected in series in the order recited in the preceding sentence, but with reference to the rectifiers themselves the connections are as follows:

The resistor R1 is connected directly across the direct current terminals of rectifier CR2; resistors R2, R7 and R10, connected in series, are connected directly across the direct current terminals of rectifiers CR3; resistors R20 and R14, connected in series, are also connected directly across the direct current terminals of rectifier CR3; and resistor R13 is connected directly across rectifier CR3A.

From the connections of the resistors just discussed with reference to the rectifiers just discussed it is apparent that the negative terminal of all the rectifiers CR2, CR3 and CR3A have their negative terminals connected together through lead 33 and that this lead 33 is connected to the junction J1 between resistors R1 and R2 and is connected to the junction J3 between resistors R13 and R14, and that the positive terminal of rectifier CR3 is connected to the junction J2 between resistors R10 and R20. The direct current terminals of the rectifier are thus connected in a loop circuit including resistor R10, the frequency reference potentiometer R7, and the resistor R2 to the negative conductor 33.

As is apparent from the connections of full-wave rectifier CR3 heretofore explained and the showing in FIG. 2B, the positive terminal of rectifier CR3 is connected to junction J2 and the negative terminal to junction J1 and the frequency reference potentiometer R7 is connected between resistors R2 and R10. Since the positive potential at lead 39 is sensitively and accurately variable as a function of the minutest tendency of a change of frequency and the positive potential of junction J2 is fixed, the voltage across resistors R2, R7 and R10 thus constitutes a reference voltage. It is apparent that lead 45 may be so positioned on resistor R7 that the voltage drop across leads 39 and 45 will be a function of such minute tendency of a change of frequency.

Figure 4:
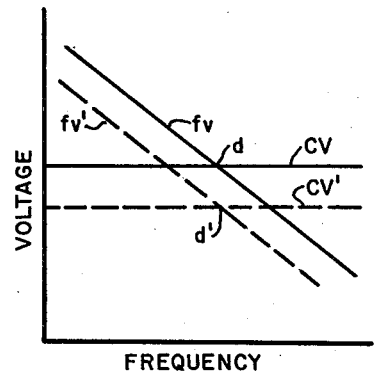
FIG. 4 shows some curves of value in understanding the frequency control of this invention.
Figure 5:
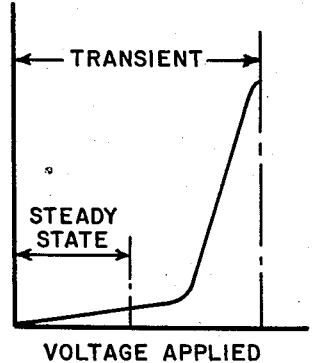
FIG. 5 shows the operating characteristic of a circuit used in this invention to obtain some very desirable operation hereinbelow explained.

From explanations made hereinbefore, it is apparent that the voltage drop through resistors R10, R7 and R2 is from positive to negative to lead 33. This means that tap 45 on potentiometer R7 is positive with respect to lead 33. Since lead 39 is positive with respect to lead 33, it is apparent that when the output voltage of rectifier CR3 is constant, which is true for all normal operation of the alternator, and the frequency and voltage output are constant, that tap 45 may be shifted to such a point on resistor R7 that tap 45 has the same positive voltage value as lead 39. Shifting tap 45 merely means that curve CV may be shifted up or down as required. If the alternator frequency is at the desired value, say 60 cycles, and the alternator voltage is at the desired constant value, then the voltage value across leads 39 and 33 will be, for example, at $d$ on curve $fV$. By shifting tap 45, the curve CV is shifted until it includes point $d'$. See FIG. 4.

In practice, this is accomplished by shifting tap 45 in such a direction until the voltage across lead 39 and lead or tap 45 is zero. Thereafter, any departure of the frequency from the desired frequency will shift the direct current voltage across lead 39 and tap 45 along curve $fV$. If the frequency increases, lead 39 will have a lower voltage than lead 45 and when the frequency decreases, lead 45 will have a lower voltage than lead 39. The magnitude of the direct current voltage across lead 45 and lead 39 will be a measure of the magnitude of the departure of the frequency from a desired frequency and the sense, or effective polarity of the voltage, will be a function of the direction of the departure of the frequency from a desired frequency.

Changes in alternator voltage, other than transient changes, have but a small effect, but if there is such a change the outputs of the rectifiers CR2 and CR3 are affected substantially alike. The output from rectifier CR3 during a decrease in voltage will shift curve CV to position CV', but the output of rectifier CR2 will shift curve fV to fV'. The difference voltage is still zero since point d' is still at the same frequency value represented by point d.

By providing the magnetic amplifiers with control windings responsive to a selected portion of the voltage drop across leads 39 and 45, a control is provided as a function of the minutest tendency of a departure of the frequency of the alternator from a selected value. A minute tendency to a change of the frequency of generator G with respect to a selected reference frequency suffices to produce a voltage drop across leads 39 and 45. A control effect may thus be produced in the magnetic amplifiers before there is any appreciable change in speed of the prime mover. A change in throttle position may thus be effected before there is a noticeable speed change to counteract the speed change tendency.

There are some very important functions of this circuitry that should be pointed out. When there is a rapid, or transient, change of alternator output voltage, as there will be when there is a rapid change of load, then curve CV (see FIG. 4) moves substantially in time with such rapid voltage change. There is substantially no time delay and the change is a function of the instantaneous load on the alternator.

The inherent characteristics of the frequency responsive portion of this circuitry, in view of the necessary inclusion of reactors and capacitors in this portion of the circuitry, is such that its output lags the output of the reference voltage. The angle of lag may be as much as 180°.

This means, if a rapid rise in load on the alternator takes place, that curve CV substantially instantly changes to position CV', and as much as 180° later curve fV changes to position fV'. During the interim curve CV is in the CV' position and curve fV moves to its new position fV', point d moves down toward the right along curve fV. The resulting transient action is thus in a direction to give speed change anticipation. When there is a rapid dumping of alternator load point d, of course, moves up and to the left of curve fV. Again the speed change is anticipated.

For this electric governor the response is thus very fast, and the governor is to an extent load responsive. However, to further improve the operation, a measure of the power output of the alternator is made. How the $3\phi I \cos \theta$ signal is used will become more apparent hereinafter.

In practice, lead 45 is adjusted to such a position on R7 that there is no voltage across leads 39 and 45 when the frequency of the generator G is just right. If for any cause there is a slight change in the frequency in such a direction that lead 39 becomes more positive than lead 45 then an energized circuit is established from lead 39 through the frequency gain adjusting resistor R18, conductor 40, control windings 41 and 42 of magnetic amplifier MA1 and control windings 43 and 44 of magnetic amplifier MA2 to lead 45. If the speed change is such that lead 45 is more positive than lead 39, then the control effect of the control windings 41, 42, 43 and 44 is, of course, in an opposite sense in the respective magnetic amplifiers.

The direct current voltage output appearing at the outer terminals of resistors 9 and 10 is proportional to $3\phi I \cos \theta$ and is supplied directly to leads 65 and 74 and these leads 65 and 74, disregarding for the moment other connections that may be made, are connected directly across the feedback gain adjusting resistor R15. Any control winding of the magnetic amplifiers connected in a loop circuit including resistor R15 or a portion of it, will thus provide a signal as a function of $3\phi I \cos \theta$. It has been found that only the rate of load change is necessary to provide effective control. The capacitor C8 provides this effective load rate control.

Since the rectifier CR3 provides a constant voltage across resistors R14 and R20 and rectifier CR3A provides a voltage across resistor R13 that is proportional to throttle position, and the rectifiers CR3 and CR3A are interconnected with the resistors R13, R14 and R20 as shown and hereinbefore explained, it is apparent that the voltage across tap 57 and lead 63 will be proportional to throttle position. Since the rate of throttle movement need only to be used the capacitor C8 is used to provide a rate signal. The capacitor C8 thus does double duty, it provides a rate of load change signal and a rate of actuator position signal.

These two signals are mixed and fed to the control windings 59, 60, 61 and 62. The circuit for these windings may be traced from tap 57 adjustably connected to the feedback gain adjusting resistor R15, through the adjustable resistor R16, control windings 59 and 60 of the magnetic amplifier MA1, control windings 61 and 62 of the magnetic amplifier MA2, lead 63, resistor R13, a selected portion of the resistor R14, lead, or tap 54, capacitor C8, a portion of the resistor R15 to tap, or lead 57.

In earlier governors where load sensing was used the load sensing had to be in a proportional manner and required that both the engine throttle position output and load sensing output be linear and be matched. In this control these difficulties are avoided by using the load signal as a rate function so that a speed change anticipation signal appears only at the time of a load change and is zero for steady state conditions.

This 1000 to 1200 c.p.s. magnetic amplifier, comprising the two units MA1 and MA2, is thus provided with the bias windings 31, 32, 33 and 34, the frequency signal windings 41, 42, 43, and 44, the combination of the load rate signal and actuator position rate signal windings 59, 60, 61 and 62. This magnetic amplifier thus mixes and amplifies these signals. When parallel operation is used the load sharing signal windings 75, 76, 77 and 78 are also used. The magnetic amplifier thus commands the electrohydraulic actuator to make necessary throttle corrections to effect proper operation, that is constant engine speed of operation and to thus obtain constant frequency.

With the prior art similar electric governors, as a result of the high gain circuits used, it has been difficult in many cases to adjust droop to more than 1% without reducing system frequency gain. A feature of this invention permits the load sensing signal to be applied in the positive direction as a rate for speed change anticipation, in the positive or negative direction proportional for isochronous paralleling and load sharing, and in a proportional negative direction for droop adjustment.

The $3\phi I \cos \theta$ load measuring circuit presents a direct current signal proportional to the load on the engine driven generator. This signal is converted into a rate signal by the series capacitor C8 such that at any steady load the output is zero. At times of load transients, the output is proportional to the amount of load change and is of a polarity to open or close the throttle in case of load increase and decrease, respectively. Since the load change occurs prior to the speed change, the load sensing unit in effect gives a speed change anticipation signal to the magnetic amplifier thereby permitting the governor to be used for sets having rather strict requirements.

Since both the feedback and load sensing signals are of a rate nature and decay to zero under steady state conditions, and the frequency error detection circuit is a null device, no signal remains to cause droop.

Figure 7:
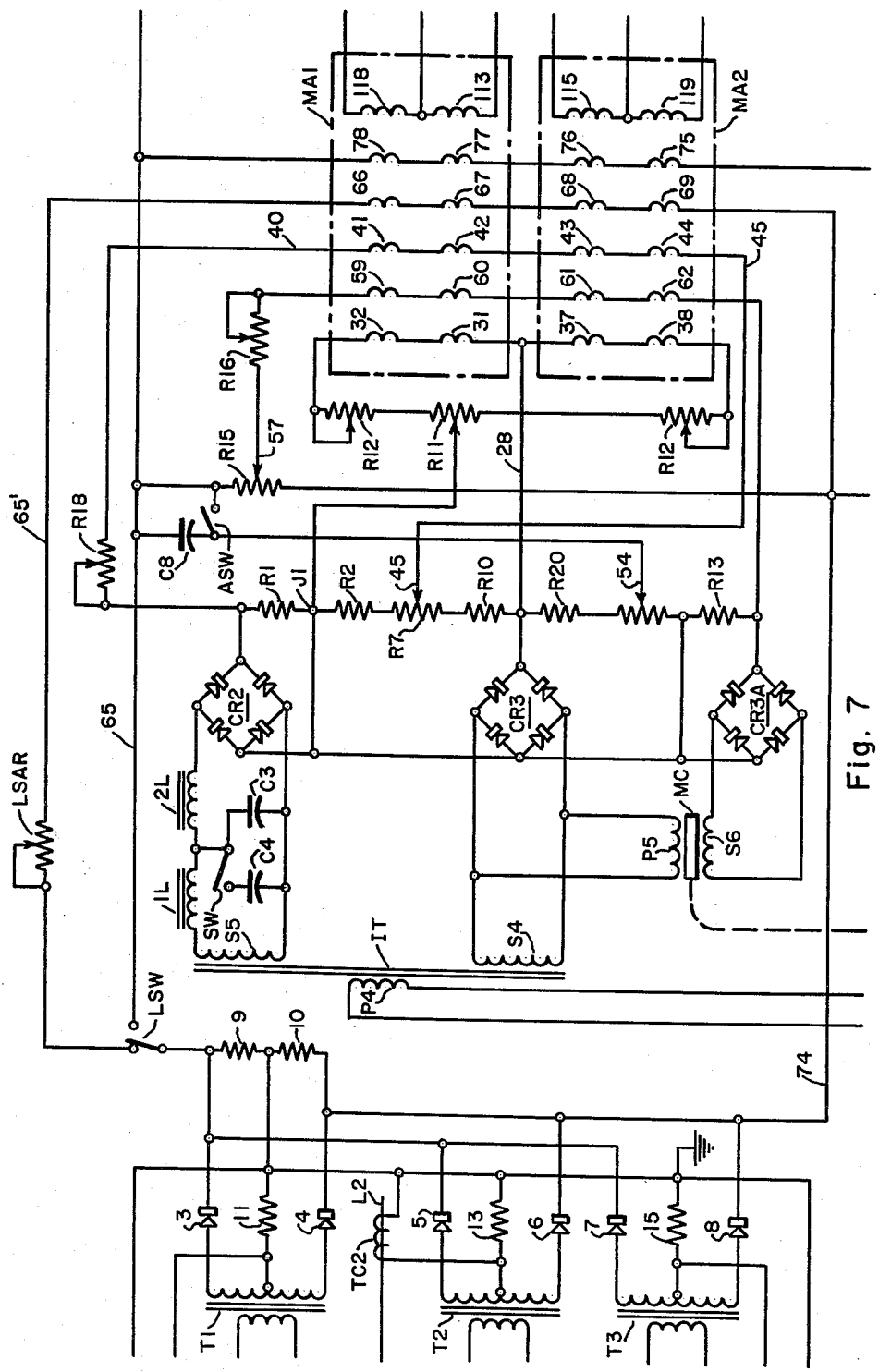
FIG. 7 is a diagrammatic showing of a modification.

If droop is required, either a proportional actuator position signal or a proportional load signal, or both, may be introduced by the inclusion in the proper direction of additional control windings on the magnetic amplifier to obtain droop as the load increases. The arrangement for a proportional load signal is shown in FIG. 7. Under these conditions, since the load signal used for droop is proportional, a signal will remain to hold the droop after all other signals have nulled.

The proportional load signal is also used to compare loads on various sets in parallel and through the magnetic amplifier load sharing control windings force each set to hold its share of the load.

This signal proportional to load may be effected by providing the magnetic amplifiers MA1 and MA2 with the control windings 66 and 67, and 68 and 69, respectively. The circuit for these additional control windings may be traced from the upper terminal of resistor 9 through the load selector switch LSW, the load signal adjusting resistor LSAR, windings 66, 67, 68 and 69 to conductor 74.

By throwing the load selector switch LSW to contact the terminal on conductor 65, the circuit through the windings 66, 67, 68 and 69 is opened and the effective circuitry as far as the load signal is the same as shown in FIGS. 2A and 2B.

By using the actuator selector switch ASW to shunt the capacitor C8, the actuator signal is a proportional signal. The two switches LSW and ASW make it possible to provide either a proportional actuator position signal or a proportional load signal or both.

Some brief restatements in the nature of a résumé may be helpful.

Within the governor, the generator voltage output is isolated by the transformer IT. The speed of the engine is there ascertained by measuring the frequency of the generator voltage. The frequency measuring circuit is a tuned LC circuit. The reactors 1L and 2L and capacitor C3 are used when a 60 or 400 cycle generator is involved and these same reactors and the same capacitor and the additional capacitor C4 is used when a 50 cycle generator is involved.

The function of the frequency measuring circuit is to convert the generator frequency to a proportional A.C. voltage. This voltage is rectified, and after rectification the frequency measuring voltage is placed across a fixed resistor R1 and this final D.C. voltage is then an indication of actual engine speed, or generator frequency.

A reference frequency is used to indicate at what frequency it is desired to operate. Since the desired frequency is 60 cycles (in some cases 400 cycles) ±5% the frequency reference must be adjustable. Rectified A.C. voltage placed across a potentiometer, as R7 and the directly associated resistors, fulfills this requirement. The level of this D.C. voltage is then raised or lowered to decrease or increase the frequency setting of the governor.

From the frequency measuring and frequency reference circuits two independent D.C. voltages are obtained. One D.C. voltage is proportional to the actual generator frequency and the other is proportional to the desired generator frequency. In the circuitry these two voltages are compared and from this comparison the governor can ascertain whether the generator is at the correct frequency or higher, or lower. Any error, positive or negative, between the actual frequency and the reference frequency, results in a D.C. error signal in proportion to the polarity and magnitude of the difference.

This D.C. frequency error signal is the input to the frequency control windings 41, 42, 43 and 44 of the magnetic amplifier. The magnetic amplifier characteristics are so chosen that a small amount of D.C. signal in the control windings effects a large change in the output windings 113, 115, 118 and 119.

The foregoing description is mostly directed to a governor control for a single prime mover driving one alternator. In actual practice two or more alternators, sometimes not of equal capacity, may be connected to supply a common load and are driven by as many separate prime movers. When this is the case, provision must be made in the control of each governor to effect proper load sharing.

Figure 8:
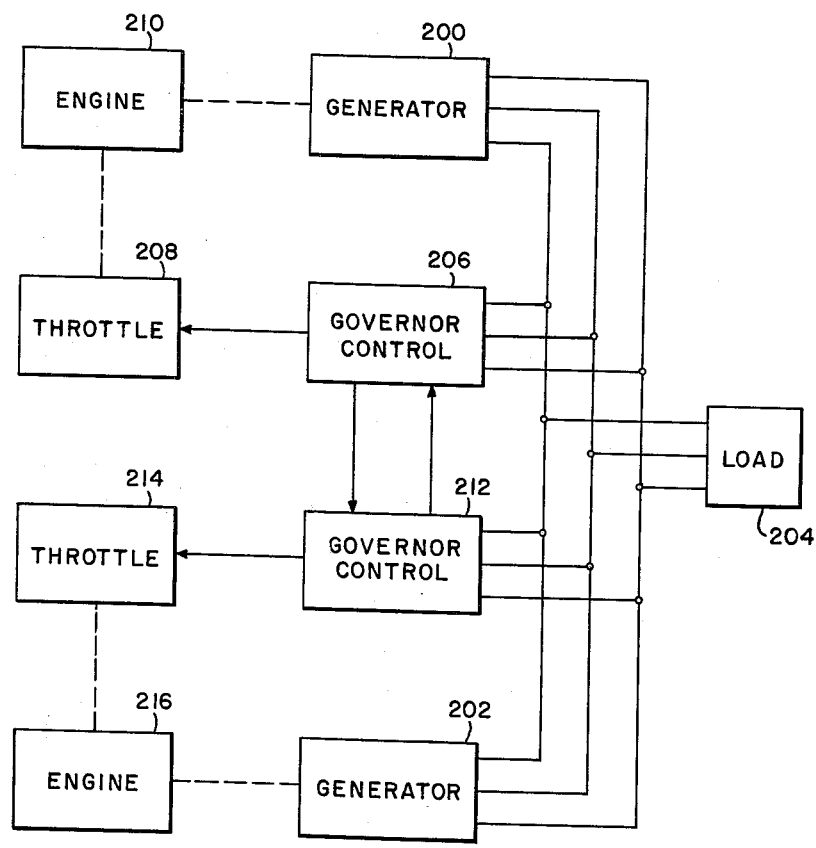
FIG. 8 is a diagrammatic showing of parallel connected generators having electric governor controls.

FIG. 8 diagrammatically shows two generators 200 and 202 parallel connected to a common load 204. A governor control 206 is operative with the generator 200 for actuating a throttle 208 for the engine 210 driving the generator 200. A governor control 212 is operative with the generator 202 for actuating a throttle 214 for the engine 216 driving the generator 202. The load sharing windings of each governor control 206 and 212 are operative with the other governor control respectively.

The control of each prime mover and its alternator is identical to the one hereinabove disclosed, and may be considered to the right of the Paralleling Switch shown at the upper right of FIG. 2B.

While but one embodiment of this invention has been disclosed and two load sensing circuits disclosed, it is understood that the invention is capable of various other adaptations all falling within the spirit and scope of this invention.

I claim as my invention:

1. An electric control system for the operation of a suitable load as the electrohydraulic actuator of the throttle of a prime mover coupled to drive an alternator, said electric control system comprising the combination of magnetic amplifier means having main windings, armature means actuated by the main windings, said armature means being coupled to any suitable load, which load may be the electrohydraulic actuator hereinabove mentioned in the preamble, said magnetic amplifier means being of a selected type, means for supplying said magnetic amplifier means from a source of constant alternating current voltage and having a constant frequency, said magnetic amplifier means having a plurality of sets of control windings, first electrical control means for producing an output signal that is a function of the difference of the frequency of the alternating current potential of the alternator from a selected frequency, second electrical control means for producing an output signal as a function of the rate change of load on the alternator, third electrical control means for producing an output signal that is a function of the rate of change of position of said armature means, and fourth electrical control means for producing an output signal of a selected value to the points of operation of the magnetic amplifier means on its characteristic, and circuit means for interconnecting said electrical control means with selected sets of said control windings.

2. An electric control system for the operation of a suitable load, as the electrohydraulic actuator for the throttle of a prime mover coupled to drive an alternator, said electric control system comprising the combination of, magnetic amplifier means having main windings, armature means actuated by the main windings, said armature means being coupled to any suitable load, which load may be the electrohydraulic actuator hereinabove mentioned in the preamble, said magnetic amplifier means being of a selected high frequency type, means for supplying said magnetic amplifier means from a source of constant alternating current voltage in the neighborhood of 8 volts and having a constant frequency in the neighborhood of 1200 cycles per second, said magnetic amplifier means having a plurality of sets of control windings, first electrical control means for producing an output signal that is a function of the difference of the frequency of the alternating current potential of the alternator from a selected frequency, second electrical control means for producing an output signal as a function of the rate of load change on the alternator, third electrical control means for producing an output signal that is a function of the rate of position change of said armature means, and fourth electrical control means for producing an output signal of a selected value to effect operation of the magnetic amplifier means at selected points on its characteristic, and circuit means for interconnecting said electrical control means with selected sets of said control windings.

3. Electric control systems for the operation of suitable loads, as the electrohydraulic actuators of the throttles of prime movers each driving an alternator and the alternators being connected in parallel to a suitable load, said electric control systems each comprising the combination of, magnetic amplifier means having main windings, armature means actuated by said main windings, said armature means being coupled to any suitable load, which load may be the electrohydraulic actuator hereinabove mentioned in the preamble, said magnetic amplifier means being of a selected type, means for supplying said magnetic amplifier means from a source of constant alternating current voltage and having a constant frequency, said magnetic amplifier means having a plurality of sets of control windings, first electrical control means for producing an output signal that is a function of the difference of the frequency of the alternating current potential of the alternator from a selected frequency, second electrical control means for producing an output signal as a function of the rate change of load on the alternator, third electrical control means for producing an output signal that is a function of the rate of change of position of said armature means, fourth electrical control means for producing an output signal of a selected value, and fifth electrical control means for producing an output signal that is a function of the relative loading of said alternators connected in parallel, and circuit means for interconnecting said electrical control means with selected sets of said control windings.

4. Electric control systems for the operation of suitable loads as the electrohydraulic actuators of the throttles of prime movers each driving an alternator and the alternators being connected in parallel to a suitable load, said electric control systems each comprising the combination of, magnetic amplifier means having main windings, armature means actuated by said main windings, said armature means being coupled to any suitable load, which load may be the electrohydraulic actuator hereinabove mentioned in the preamble, said magnetic amplifier means being of a selected high frequency type, means for supplying said magnetic amplifier means from a source of constant alternating current voltage in the neighborhood of 8 volts and at a constant frequency in the neighborhood of 1200 cycles per second, said magnetic amplifier means having a plurality of sets of control windings, first electrical control means for producing an output signal that is a function of the difference of the frequency of the alternating current potential of the alternator from a selected frequency, second electrical control means for producing an output signal as a function of the rate change of load on the alternator, third electrical control means for producing an output signal that is a function of the rate of change of position of said armature means, fourth electrical control means for producing an output signal of a selected value, and fifth electrical control means for producing an output signal that is a function of the relative loading of said alternators connected in parallel, and circuit means for interconnecting said electrical control means with selected sets of said control windings.

5. An electric control system for controlling the operation of the actuator of a prime mover coupled to drive an alternator for energizing a load, said electric control system comprising the combination of, signal amplifier means for controlling the movement of said actuator, first control means for producing a control signal as a function of alternator output frequency, second control means for producing a control signal corresponding to a reference frequency, means for energizing said signal amplifier means as a function of the difference of said control signals of said first and second control means, third control means for producing a control signal as a function of the $3\phi I \cos \theta$ power output of said alternator to said load, fourth control means for producing a control signal as a function of the position of said actuator, mixing means including a capacitor for mixing the control signals of the said third and fourth control means to produce an output signal that is a function of both the rate of change of said load and the rate of change of position of said actuator, said mixing means being connected to supply said output signal to said signal amplifier means.

6. An electric control system for the operation of a suitable load, as the electrohydraulic actuator for the throttle of a prime mover coupled to drive an alternator, said electric control system comprising the combination of, magnetic amplifier means having main windings, armature means actuated by the main windings, said armature means being coupled to any suitable load, which load may be the electrohydraulic actuator hereinabove mentioned in the preamble, means for supplying said magnetic amplifier means with a suitable alternating current potential, said magnetic amplifier means having a plurality of sets of control windings, first electrical control means for producing an output signal that is a function of the difference of the frequency of the alternator potential and a reference alternating current potential, second electrical control means for producing an output signal rate of load change on the alternator, third electrical control means for producing an output that is a function of the operation of said load actuated by the magnetic amplifier means, and fourth electrical control means for producing an output signal of a selected value, and circuit means for interconnecting said electrical control means with selected sets of said control windings.

7. In speed control apparatus for controlling the speed of a prime mover operative with a generator energizing a load, the combination of means operative with said generator for providing a first control signal in accordance with the output of said generator, means for providing a second control signal in accordance with a predetermined desirable output for said generator, signal comparison means for providing a third control signal in accordance with the difference between said first control signal and said second control signal, a movable member operable to control the speed of said prime mover, means responsive to movement of said member for providing a fourth control signal in accordance with the rate of movement of said member, means responsive to changes in said load for providing a fifth control signal in accordance with the rate of change of said load, and control means for controlling the movement of said member in response to said third, fourth and fifth control signals.

8. In apparatus for controlling the output frequency of an alternator operative with a prime mover for energizing a load, the combination of first means for providing a first signal proportional to the alternator output frequency, second means for providing a second signal proportional to a desired output frequency, circuit means for providing a third signal in accordance with the difference between said first and second signals, a movable control member operative with said prime mover for controlling the output frequency of said alternator, third means operative with said control member for providing a rate of control member movement signal, fourth means operative with said load for providing a rate of load change signal, and control means responsive to each of said third signal, said rate of control member movement signal and said rate of load change signal for controlling the movement of said control member.

References Cited in the file of this patent

UNITED STATES PATENTS

| | | |
|---|---|---|
| 2,790,092 | Guth | Apr. 23, 1957 |
| 2,909,672 | Emery | Oct. 20, 1959 |
| 2,969,476 | Hysler | Jan. 24, 1961 |